United States Patent

Baecker

Patent Number: 6,068,230
Date of Patent: May 30, 2000

[54] DEVICE FOR STORING A HARD-TOP

[76] Inventor: Manfred Baecker, Am Längenmoosgraben 5, D-85221 Dachau-Pullhausen, Germany

[21] Appl. No.: 09/112,122

[22] Filed: Jul. 8, 1998

[30] Foreign Application Priority Data

Jul. 9, 1997 [DE] Germany .......................... 197 29 427

[51] Int. Cl.[7] .................................................. A47H 1/10
[52] U.S. Cl. ......................... 248/327; 294/149; 294/155; 254/338; 254/334
[58] Field of Search ..................... 248/622, 327, 248/323, 603, 604, 614; 294/24, 78.2, 82.12, 157, 150, 165, 149, 153–155; 254/338, 47, 336, 334, 335, 226, 269; 411/511, 517, 526, 348; 414/626; 383/22, 67, 97; 296/218, 136

[56] References Cited

U.S. PATENT DOCUMENTS

| | | | |
|---|---|---|---|
| 4,085,844 | 4/1978 | Dunchock | 206/335 |
| 4,096,977 | 6/1978 | Barville et al. | 224/5 |
| 4,600,177 | 7/1986 | Fritz | 254/338 |
| 4,830,386 | 5/1989 | Snoke et al. | 280/38 |
| 4,908,916 | 3/1990 | Berte | 24/453 |
| 5,263,687 | 11/1993 | Garbiso | 254/334 |
| 5,492,385 | 2/1996 | Champion | 294/157 |
| 5,542,273 | 8/1996 | Bednarz | 411/348 |

FOREIGN PATENT DOCUMENTS

| | | | |
|---|---|---|---|
| 9011895 | 1/1991 | Germany | E04H 6/42 |
| 4238346 | 5/1994 | Germany | E04H 6/42 |
| 9409349 | 9/1994 | Germany | E04H 6/42 |

*Primary Examiner*—Anita M. King
*Assistant Examiner*—Michael D. Nornberg
*Attorney, Agent, or Firm*—Steinberg, Raskin & Liberchuk, P.C.

[57] ABSTRACT

A holding device for storing a hard-top including a belt system into which the hard-top can be placed in such manner that the weight of the hard-top is supported essentially entirely by the belt system. The belt system enables the hard-top to be fixed in the holding device and attached thereby to a wall or a ceiling of a room. A protective cover into which the belt system is sewn, can also be provided. The holding device is suitable for hard-tops with attachment pins as well as for hard-tops without attachment pins.

22 Claims, 4 Drawing Sheets

DEVICE FOR STORING A HARD-TOP

FIELD OF THE INVENTION

The present invention relates to a storage unit for storing a hard-top of a cabriolet or a roadster as well as for storing a removable, rigid superstructure of other vehicles.

BACKGROUND OF THE INVENTION

Over the last few years, many leisure-time vehicles such as cabriolets or roadsters have gained increasing popularity among the populace. These vehicles do not have a fixed top, but rather, only a manually or automatically unfolding fabric roof for the protection of riders during inclement weather. During the cold season, in the fall and winter, the insufficient heat insulation characteristics of the fabric top become however noticeable, so that such vehicles are only conditionally usable year-round. Furthermore, the fabric top is usually provided with simple, unheated plastic hear windows which do not ensure the necessary clear vision to the rear in the fall or winter.

The manufacturers of cabriolets and roadsters therefore offer so-called hard-tops for their vehicles. These are for the most part tops made of plastic or light metal which are often equipped with a heated rear window and are lined on the inside with a fabric ceiling. Such a hard-top is attached on the vehicle and provides the insulation and comfort of a limousine in winter. During the warm season, the hard-top is however not needed and must therefore be stored, usually in a garage or in a cellar.

Normally, at least two attachment pins extend downward out of the hard-top and are used to attach the hard-top to the body of the cabriolet or the roadster. Holding devices to store a hard-top are known, using these protruding attachment pins to attach the hard-top in the holding device. Since hard-tops are relatively heavy, weighing from about 25 kg to about 45 kg, depending on the design, the known holding devices have a metal frame on which the two attachment pins of the hard-top can be attached. Furthermore, the holding device is usually provided with suitable fastening devices by means of which the overall unit consisting of holding device and the hard-top attached therein can be mounted to the wall or the ceiling of a room. In some cases, a separate fabric cover is provided as a dust protection and can be pulled over the metal frame and the hard-top attached therein. The hard-top can therefore be suspended by means of the metal frame on the wall or on the ceiling or, if the metal frame is provided with an additional stand, can be placed upright on the floor for storage. The overall arrangement consisting of metal frame and hard-top however becomes often so heavy that several manufacturers offer in addition a rolling table for easy transportation of the hard-top.

Hard-tops with no such attachment pins are also known. The hard-top of the British roadster MG-F for example, snaps into a kind of groove in the vehicle body and is attached by means of levers located above the hard-top. The support of these hard-tops is also effected by means of a usually rolling metal frame in which the hard-top, if necessary provided with a protective cover, can be placed.

In German utility model no. DE 94 09 349 U1, a lifting device for the hard-top of a motor vehicle is described. The lifting device has belts, one end of each of which is connected to a motor-driven belt roller. The free end of each belt has hooks which are applied to the rear or forward edge of the hard-top.

German patent application no. DE 42 38 346 A1 describes a device to store the hard-top of a cabriolets on a garage ceiling, which is provided with a motor-driven lifting device of the type described in DE 94 09 349 U1 (discussed above) and in addition comprises a storage box which can be attached to the ceiling and is open on the bottom.

In German utility model no. DE 90 11 895 U1, a device to attach a bicycle to a wall is described. The device has a band for stabilizing the bicycle. The band has a holding ring which can be connected to a hook fastened into the wall. The weight of the bicycle rests on a rail which is connected to the wall. This device is not suitable to store hard-tops.

The known holding devices for hard-tops have many disadvantages. Overall, they are very heavy and mounting the hard-top in the frame and attaching the frame to the wall or the ceiling of a room is often very complicated. Furthermore such designs are very expensive and cost usually about 10% to about 20% of the price of the hard-top itself. Such designs are therefore not sold directly together with the hard-top but are offered as a separate additional equipment.

OBJECTS AND SUMMARY OF THE INVENTION

It is therefore the object of the present invention to provide a holding device for the storage of a hard-top which is light-weight.

It is another object of the present invention to provide a holding device for the storage of a hard-top which is easy to use and manipulate.

It is yet another object of the present invention to provide a holding device for the storage of a hard-top which is inexpensive to produce. The price of the holding device should only represent a minimal portion of the price of the hard-top itself, so that the hard-top can be sold regularly together with its appertaining holding device.

In order to attain these objects and others, a holding device for the storage of a hard-top in accordance with the invention comprises a belt system in which the hard-top can be inserted in such manner that the weight of the hard-top is absorbed or borne almost entirely by the belt system. The belt system is provided with means to fix the hard-top in the holding device so that the hard-top is securely retained in connection with the belt system, and means to attach the holding device to a wall or ceiling of a room. The weight of the hard-top is transferred in the device according to the invention exclusively within the belt system from the fixing means integrated therein to the fastening or attachment means which are also integrated in the belt.

The belt system may comprise in this case any tear-resistant material, e.g., leather, synthetic leather or a tear-resistant synthetic fiber and/or natural fiber fabric.

According to the invention, the belt system extends in such matter that when the holding device is suspended, the weight of the hard-top bears substantially on the belts. Since a belt system made of the above-mentioned materials has little weight while having great tensile strength, the holding device according to the invention is very light and its manufacturing costs are low. A rigid, heavy metal frame as in the designs which are known, is not needed in the device according to the invention. A bearing belt system of this type is suitable as a holding device for hard-tops with or without attachment pins.

A first advantageous embodiment of the holding device according to the invention is especially well suited for hard-tops without attachment pins. In this case, the fastening or attachment means of the belt system have belt segments which can be opened by means of closures that can be repeatedly opened and closed. The closures may be in form of Velcro™-type closures or snap fasteners.

In another advantageous embodiment of the holding device according to the invention, especially for hard-tops with attachment pins, the attachment means of the belt system comprise at least two attachment lugs adapted to receive a respective one of the attachment pins of the hard-top. The holding device according to the invention therefore includes two lugs which receive the weight of the hard-top and transmit it over a belt system to the attachment means by means of which the entire unit is attachable to a wall or to a ceiling.

In certain embodiments, the fastening means comprise at least one holding lug which is located in the central area of a first, transversal belt segment. If the holding device is designed for a hard-top with attachment pins, this would be the belt segment which connects the two attachment lugs. "Transversal" in this case refers to the longitudinal axis of the vehicle or the hard-top. Using a holding lug of this type, the holding device and the hard-top attached in it can be suspended on a hook attached to the ceiling, for example. When the center of gravity of the hard-top lies in the middle, between the two attachment pins, the hard-top is already balanced out with such a manner of attaching it and hangs horizontally under its point of attachment. Otherwise, the hard-top tilts around an axis going through the two attachment pins and touches the ceiling either with its forward or rear area.

One particular advantageous construction is to provide the attachment means, either in addition to or alternatively to the previously mentioned central holding lugs, two holding lugs which are located at the two lateral ends of the first, transversal belt segment. The lateral holding lugs protrude in that case beyond the contour of the hard-top and are therefore more easily accessible than the central holding lug. In this construction of the holding device according to the invention, the suspension of the hard-top on a wall or ceiling is especially simple.

The attachment means may furthermore comprise at least a second holding lug in which a second, longitudinally extending belt segment is provided together with a third longitudinally extending belt segment, this again with reference of the hard-top longitudinal axis as seen in the direction of travel, in the forward connecting area. When using a holding device with lugs for attachment pins, this forward holding lug is connected via the second belt segment to the first attachment lug, and via the third belt segment to the second attachment lug. In this case, the lugs constitute essentially the corner points of an equilateral triangle with the holding lug at the tip. This second holding lug is especially suited to hang the hard-top from a wall hook.

In both attachment systems, the above-mentioned weight of the hard-top is supported by the belt systems. In case of the suspension on the wall by the second holding lug, securing means should however be provided to prevent a tilting of the hard-top around the axis going through the two connecting pins, but these securing means practically need not absorb any force. Such securing means can be, e.g., a light dust cover which is sewn into the belt system.

In one variation, the holding lugs are formed by loops of the belt system. In a second alternative, the attachment and holding lugs are metal rings. Instead of metal rings, it is however also possible to use rings made of some other material suitable to support weights of several tens of kilograms.

The fastening means are advantageously provided with a closing element for each attachment lug, in which the attachment pin inserted into the attachment lug is attached so that it can be removed again. Preferably, the closing element is provided with a locking system which corresponds to the locking system in the recesses of the vehicle body in which the hard-top is anchored when in use. To ensure that the attachment pins can no longer slip out of the attachment lugs, the diameter of the closing element must of course be greater than the clear inside diameter of the corresponding attachment lug. The closing element may for example be made in form of a closing plate or closing sleeve. The closing element is advantageously connected via a cord to its appertaining attachment lug so that the closing plate does not get lost.

In an especially preferred embodiment, the holding device furthermore comprises a protective cover which can be closed and which is cut to a form that is advantageously adapted to the form of the hard-top.

There are no particular requirements for the material of the protective hull, since the weight of the hard-top is supported essentially entirely by the belt system and the cover, depending on the type of storage, is stressed at most by a tilting moment of the hard-top.

However, it is advantageous to select an especially light material for the protective cover, e.g., a plastic fabric. The cover serves mainly as a dust cover and can be additionally reinforced in the areas where it may come into contact with the ceiling, the wall or the floor. The protective cover material has advantageously a certain elasticity, e.g., a transversal elasticity, so that the cover can adapt optimally to the form of the hard-top.

The belt system can be sewn into, soldered into or glued into the protective cover.

However, since the weight of the hard-top acts practically only within the belt system, no great weight bears on the connecting seams between the belt system and the protective cover. The belt system is integrated advantageously into the protective cover, at least in the area of the attachment lugs. Preferably, the protective cover is also reinforced in these areas. The protective cover and the belt system can however also be provided in two parts, i.e., the belt system is removable and connected to the protective cover via suitable fastening means.

For the holding device according to the invention to be attached to a hook in the wall or in the ceiling as easily as possible, the belt system is preferably not connected to the protective cover in the area of the fastening means but extends outside the protective cover.

The protective cover is preferably closed with a zipper which extends over at least part of the circumference of the cover. The zipper is located most preferably in the area of the protective cover which corresponds to the rear of the hard-top. Instead of a zipper, it is of course also possible to use other closures, e.g., snap fasteners or Velcro™-like closures.

In a preferred embodiment of the holding device according to the invention, in particular for hard-tops without attachment pins, the second and third belt segments extending in longitudinal direction are made in the form of closed, surrounding belts. In the area of the zipper of the cover, these belt segments can be undone for problem-free opening of the cover. The hard-top can then be inserted easily into the cover or removed from same. Since the area of connection of the belts which can be undone represents a part of the belt system which transfers the weight of the hard-top, this connecting area which can be opened must also be made so as to resist tearing. In an especially convenient variation, the belt segments can be undone by means of Velcro™-type closures with sufficient tensile strength. The detachable connection of the belt segments can however also be established by means of snap fasteners, zippers or by simply tying the belt segments together.

In a preferred embodiment of the invention the belt system has the form of a band, but other structures, e.g., rope-like structures, can also be provided.

The present invention is described below in greater detail through examples of embodiments shown in the attached drawings.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which:

FIG. 8 shows the arrangement according to FIG. 7 as the attachment pin is locked in.

DETAILED DESCRIPTION OF THE PREFERRED EMBODIMENTS

Figure 1:
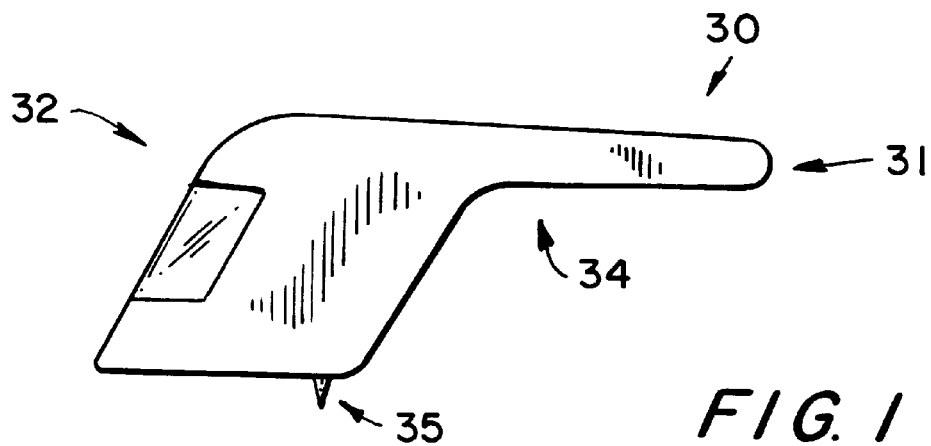
FIG. 1 shows a schematic diagram of a hard-top in accordance with the invention seen from the side.

Referring to the accompanying drawings wherein like reference characters designate identical or corresponding parts throughout the several views, FIG. 1 shows a hard-top designated generally as 30 and which includes a forward area 31, a rear area 32 and a lateral detail 34 which corresponds to the profile of the side window of the vehicle. In the lower area of the hard-top and near the transition from rear to forward area, one of the two attachment pins or springs 35 by means of which the hard-top is attached to the vehicle body is located. Such attachment pins or springs are however omitted in some of the hard-tops on the market.

Figure 2:
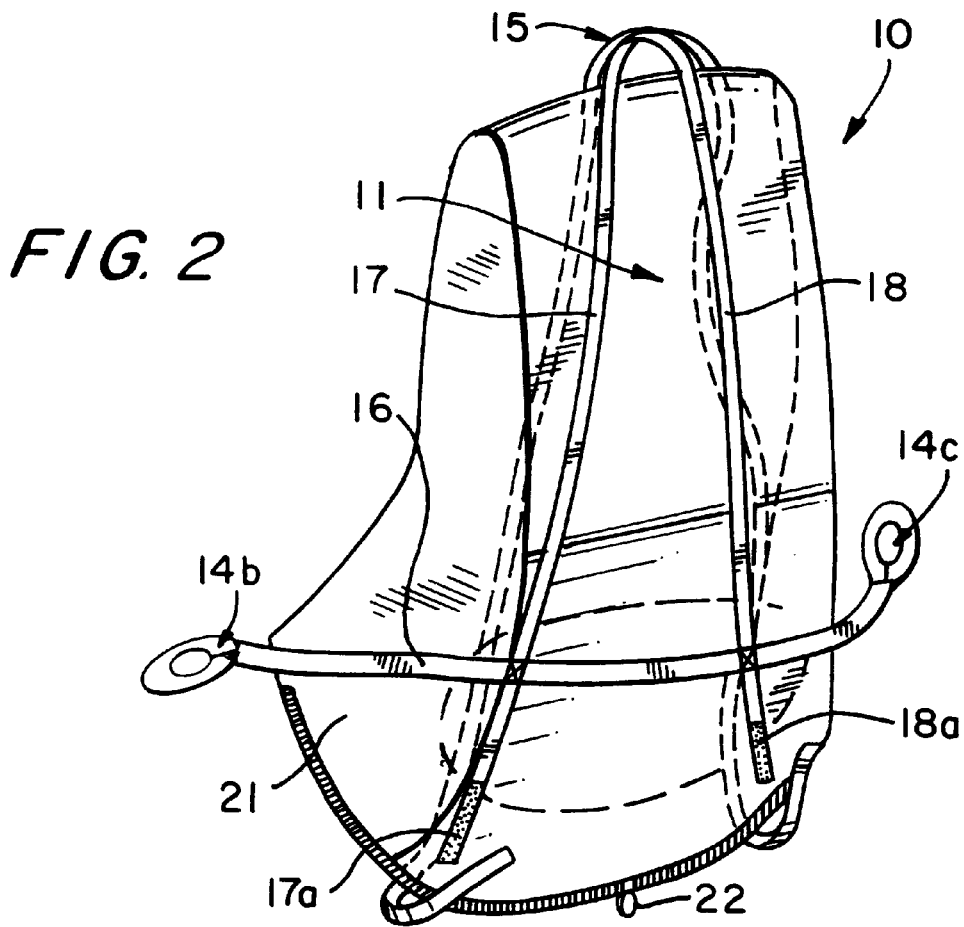
FIG. 2 shows a lateral view of a first embodiment of a holding device for a hard-top according to the invention, without attachment pins.

FIG. 2 shows a first embodiment of the holding device 10 according to the invention. This first variation is especially suited for hard-tops without attachment pins. The holding device 10 comprises a belt system 11 which comprises in the exemplifying embodiment three belts or belt segments 16, 17 and 18. However, as used herein, a belt system may comprise any number of belts including only a single belt. The first transversal belt segment 16 has lateral holding lugs 14b and 14c at its ends, and the hard-top can be suspended by these on the wall or ceiling of a room by means of a hook. If attached to the ceiling, the holding device 10 can in addition be attached to a third hook by means of a forward holding lug 15 which may be formed for instance as a loop of two longitudinally extending belt segments 17, 18. The longitudinally extending belt segments 17,18 can be connected at their crossing points to the transversal belt segment 16, e.g., sewn, soldered or glued to it. The longitudinally extending belt segments 17, 18 surround the hard-top located in a protective cover along a closed circumferential line (in FIG. 2, the areas of belts 17, 18 which are located at the back of the holding device 10 and cannot be seen are shown by broken lines). The holding device 10 includes a protective cover 21 having a zipper 22 at its rear area. In this area, the longitudinally extending belt segments 17, 18 are made so that they can be separated by means of Velcro™-type closures 17a, 18a, so that the hard-top can be inserted in the cover or be removed therefrom. The hard-top is thus supported by the belt system 11.

Figure 3:
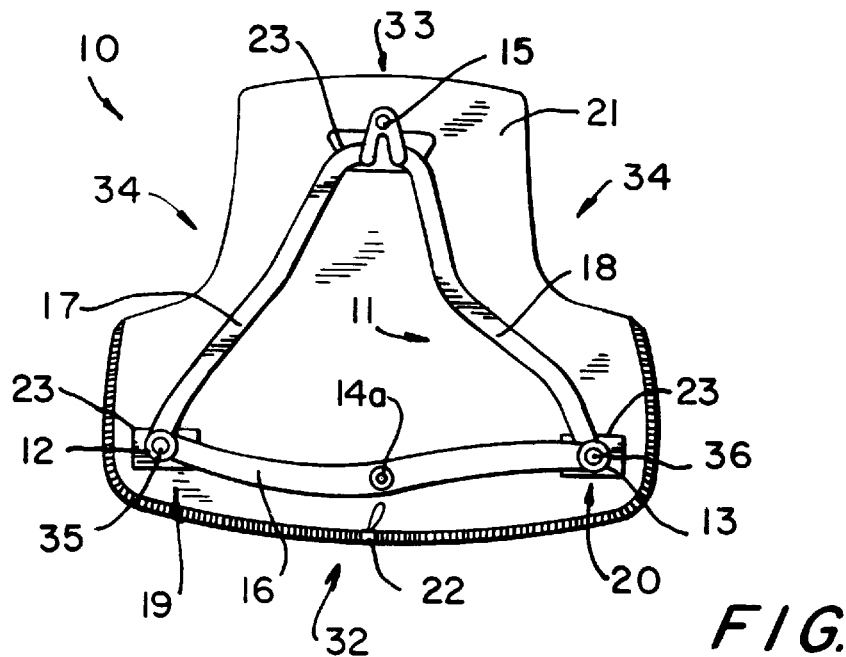
FIG. 3 shows the underside of a second embodiment of a holding device according to the invention for a hard-top with attachment pins.

FIG. 3 shows a second embodiment of the holding device 10 according to the invention. This embodiment is especially suited for hard-tops with attachment pins. The belt system of the holding device comprises three belt segments 16, 17 and 18, as in the first embodiment shown in FIG. 2. The first belt segment 16 extends between a first attachment lug 12 and a second attachment lug 13, which serve to receive the two attachment springs or pins 35, 36 of the hard-top.

FIG. 3 shows a view from below of this second embodiment of the holding device according to the invention, so that the attachment pins 35,36 protrude up from below out of the drawing plane when a hard-top 30 is in the holding device 10. The attachment pins are then held by attachment plates 19, 20 installed on the underside of the holding device 10 (see FIG. 4). In the embodiment shown in FIG. 3, approximately in the center of the belt segment 16, between the first and the second attachment lugs 12,13 in the belt segment 16, a first, central holding lug 14a is provided and serves to attach the holding device 10 to the ceiling (see also FIG. 5). The second belt segment 17 and the third belt segment 18 extend from the first attachment lug 12 or the second attachment lug 13 to a second holding lug 15 which serves to attach the holding device 10 to a wall (see FIG. 6). The belt system 11 absorbs the entire weight of the hard-top 30 when the holding device 10 is mounted on the ceiling or the wall.

Figure 6:
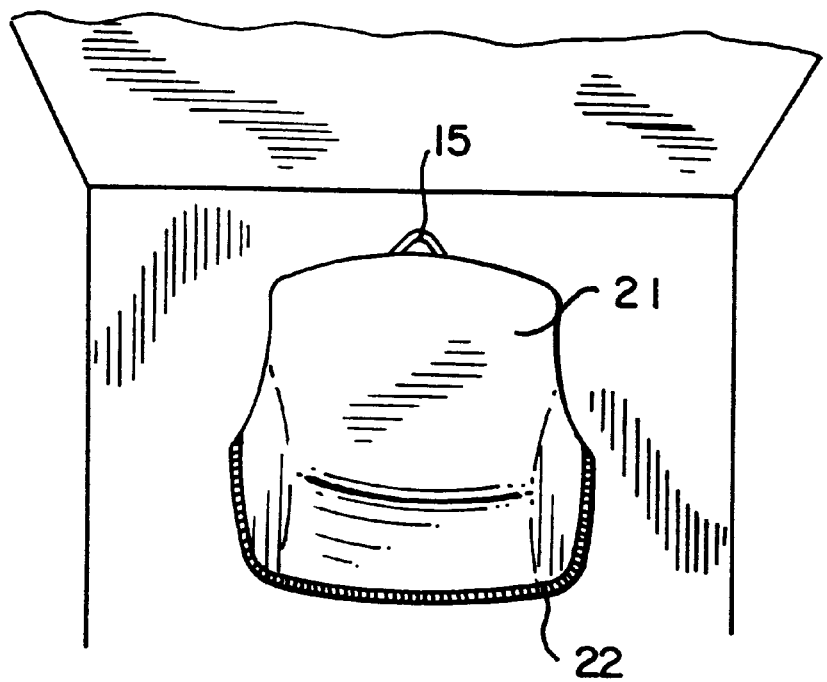
FIG. 6 shows a holding device according to FIG. 3, attached to the wall.

In the illustrated embodiment, the holding device 10 includes a protective cover 21 which can be closed at the back by means of a zipper 22. The protective cover 21 is made of a light fabric serving primarily as a dust cover. Near the first and second attachment lugs 12,13, the fabric has additional reinforcement 23 into which the attachment lugs are imbedded. A similar reinforcement is located near the second holding lug 15, whereby the second belt segment 17 and the third belt segment 18 coincide in the area of this reinforcement. In this area, the belt constitutes a small bridge, in the center of which the second holding lug is located. The belt system is connected to the protective cover merely in the area of the three reinforcements 23. The connection between belt system and protective cover near the second holding lug 15 has the additional purpose to prevent the cover from being tilted back together with the hard-top when the holding device is suspended in this holding lug (FIG. 6). The forces to be absorbed by the connection area between the reinforcement 23 and the protective cover 21 are however very low. The protective cover 21 is cut out in its forward area in accordance with the forward window profile 33. It has also the lateral cut-outs corresponding to the lateral window detail 34 of the hard-top.

It should be understood that the holding device 10 of FIG. 3 may be provided with lateral holding lugs 14b and 14c as in the embodiment of FIG. 2 in the alternative to or, in addition to, the central holding lug 14a.

Figure 4:
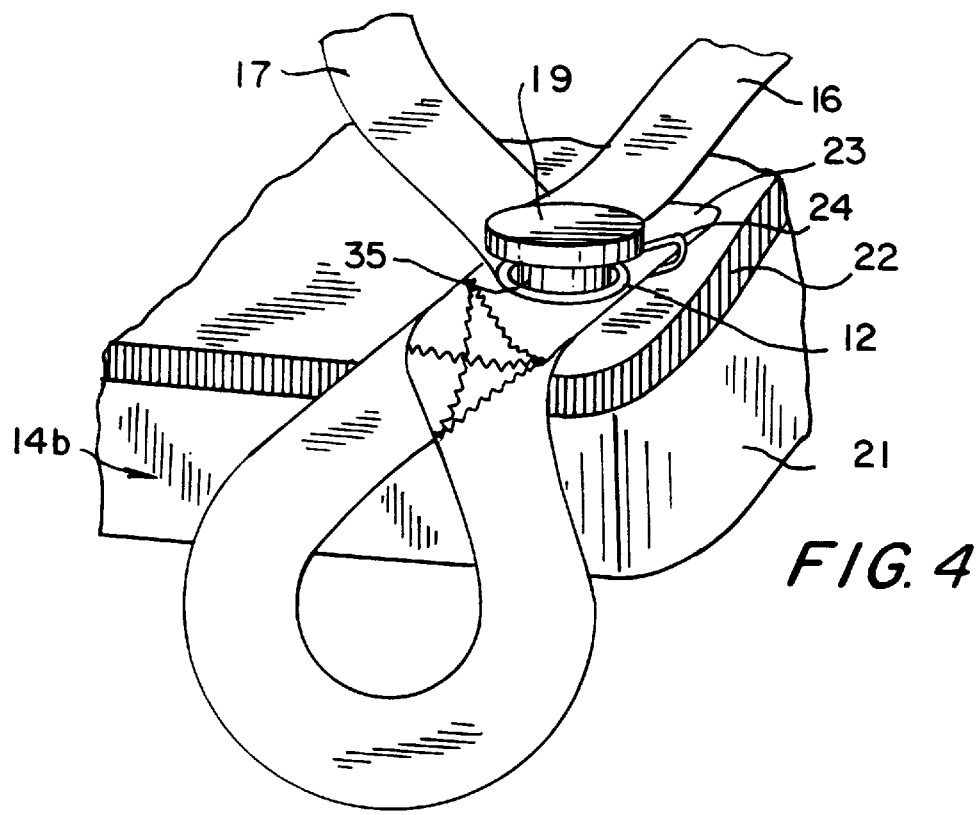
FIG. 4 shows the perspective partial view of an attachment lug of a variation of the holding device of FIG. 3.

FIG. 4 shows a detail of such a variation of the holding device 10 of FIG. 3. As shown in FIG. 4, the transversely extending belt segment 16 is extended by a lateral holding lug 14b which protrudes beyond the edge of the hard-top cover 21 and is therefore more easily accessible to the user than the central holding lug 14a.

When the user wishes to store the hard-top, he opens the zipper 22 and pushes the hard-top with its forward area 31 first from behind into the cover 21. Finally, the attachment lugs 12, 13 are pulled over the corresponding attachment pins 35,36 of the hard-top and the zipper 22 is again closed. The cover 21 is then in tight contact with the hard-top. To prevent the attachment pins 35,36 from slipping out of their appertaining attachment lugs, these pins are fixed by means of closing plates 19, 20. The closing plates 19, 20 are provided with a locking mechanism which is essentially identical with the attachment pins 35, 36 in the body of the cabriolet or the roadster. Their diameter is such that they cannot slip through the opening of the attachment lugs 12, 13. The plates 19, 20 are attached to the reinforcement areas 23 of the protective cover 21, e.g., by means of securing cords.

Figure 5:
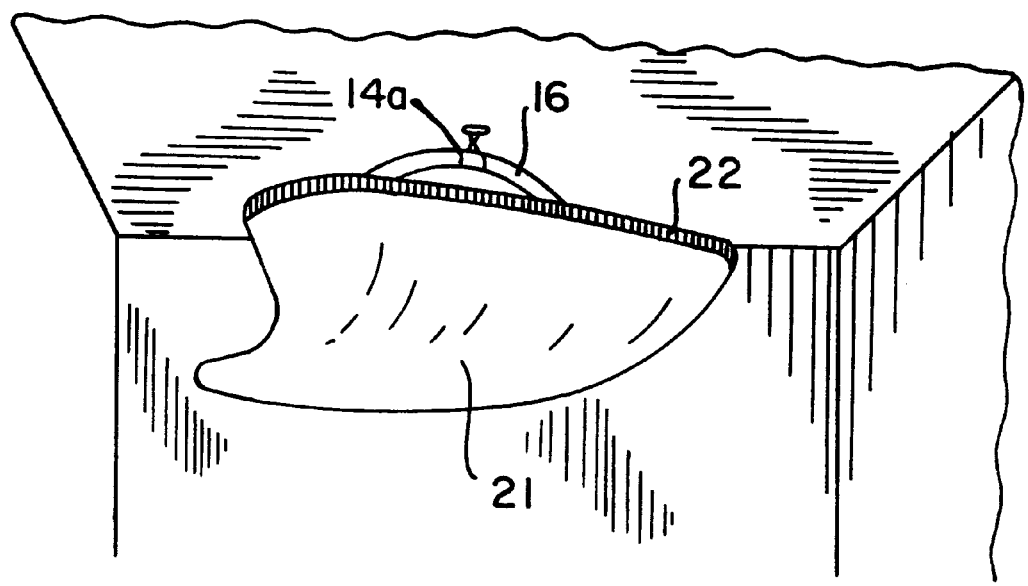
FIG. 5 shows a holding device attached to the ceiling according to FIG. 3.

As desired, the user can store the holding device according to the invention on the ceiling or on the wall of a cellar or a garage. In case of the storage as shown in FIG. 5, on the ceiling, the central holding lug 14a or the lateral holding lugs 14b, 14c which are hooked into a hook on the ceiling are used advantageously. In case of storage on the wall, lug 15 is used advantageously. In this case, the hard-top can be suspended with the front pointing up, as shown in FIG. 6. The hard-top is however attached especially advantageously with the front down on the wall. The forward area of the hard-top can then tilt against the wall and come into contact there, so that little space is required by the hard-top in the lower region of the storage space, in particular near the floor.

Figure 7:
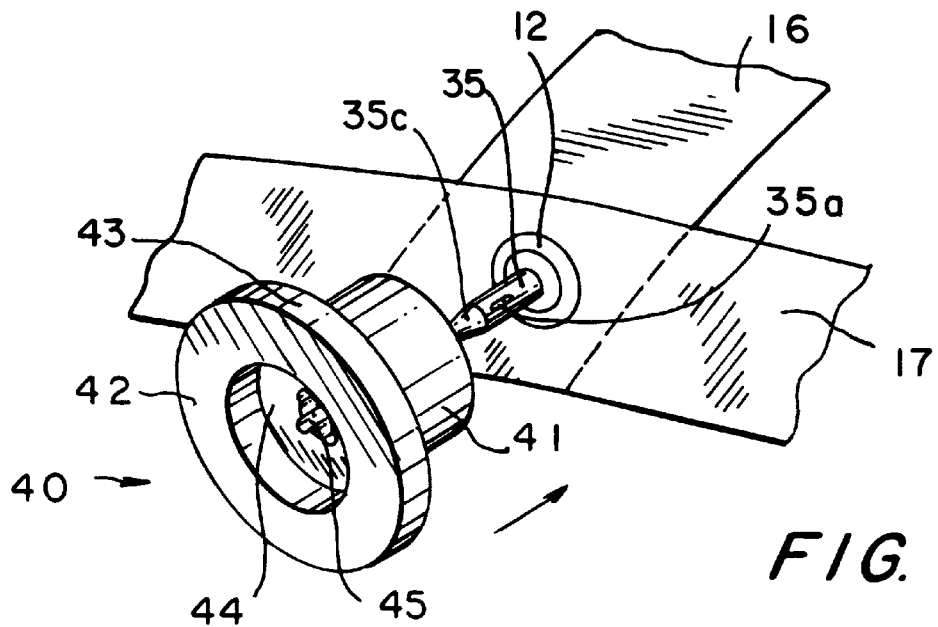
FIG. 7 shows a detail of the installation of a closing sleeve on an attachment pin of a hard-top.
Figure 8:
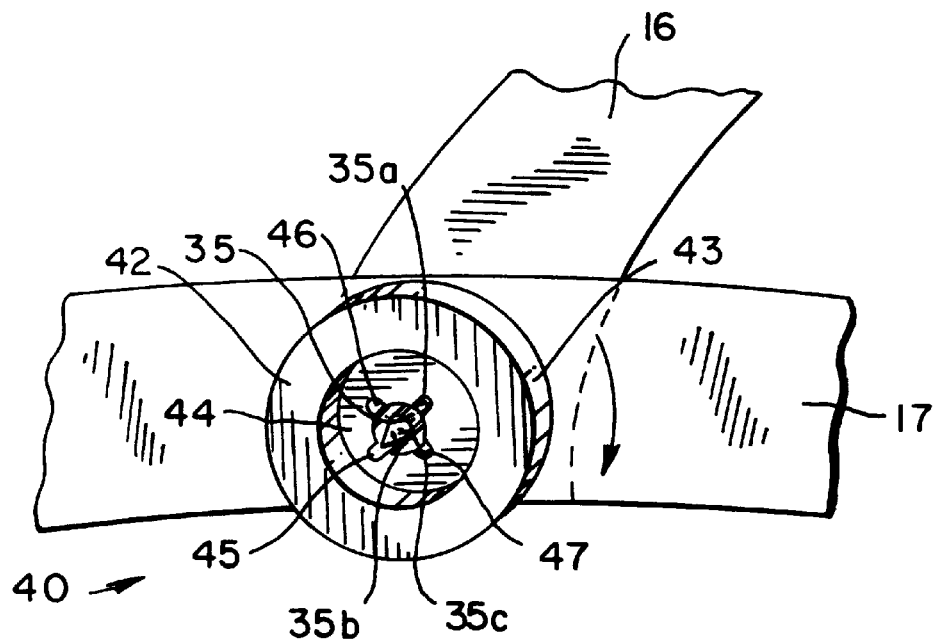

FIGS. 7 and 8 show a closing sleeve or closing element 40 which is a variation of the closing plate 19 shown in FIG. 4. The closing sleeve 40 has an oblong, essentially hollow mantle 41 which is delimited at one end of a radially protruding collar 42. Grooves or burls which provide for a better grip on the sleeve 40 can be made on the outer edge of the collar 42. On the other end, the sleeve has a bottom 44 in which an oblong opening 45 is made. Essentially at a perpendicular to the main axis of the oblong opening 45, two depressions or troughs 46, 47 are made in the bottom 44.

To lock the attachment pins 35, 36 of the hard-top in the holding device according to the invention, the user proceeds as follows: first, he pulls the protective cover 21 with the integrated belt system 11 over the hard-top and at the same time introduces the attachment pins 35, 36 into their appertaining attachment lugs 12 or 13. FIG. 7 shows this state of the attachment pin 35 in a detailed view. The pin 35 is already inserted into the attachment lug 12 of the belt segments 16, 17. The attachment pin 35 has two noses 35a, 35b protruding radially outward and diametrical opposite from one another. The user now places the closing sleeve 40 on the pin 35 in such manner (in the direction of the arrow shown in FIG. 7) that the pin 35 can be passed with its radial noses 35a, 35b through the oblong opening 45 made in the bottom 44 of the sleeve 40. The user then rotates the sleeve 45 until the noses 35a, 35b catch in the bottom 44 of the sleeve 40 (in the direction of the arrow shown in FIG. 8). The hard-top is then securely fixed in the holding device 10 since the attachment pin 35 can no longer slip out accidentally from the lug of the holding device.

The length of the sleeve 40 is sized so that the tip 35c of the attachment pin 35 does not extend beyond the collar 42 in the locked state shown in FIG. 8. In particular when the hard-top is stored on the wall (as shown in FIG. 6), the tip 35c of the attachment pin as well as the wall itself is protected against damage because only the sleeve 40 touches the wall.

The holding device according to the invention can also be used for other superstructures of vehicles, e.g., for removable, rigid covers of pick-up trucks.

The examples provided above are not meant to be exclusive. Many other variations of the present invention would be obvious to those skilled in the art, and are contemplated to be within the scope of the appended claims. For example, the fixing means for holding the hard-top in the belt system may be other than shown in the drawings and described above, such as members which are adapted to be physically connected to the hard-top, grasp the hard-top, clamp the hard-top, etc. The attachment means for enabling the belt system to be attached to a wall or a ceiling may include, other than the elements described above, any type of connecting member for enabling a connection to a surface or cooperating connecting member thereon.

I claim:

1. A holding device for storing a hard-top, comprising:
a belt system for supporting the hard-top such that said belt system bears the weight of the hard top, said belt system comprising:
a transverse belt segment and first and second longitudinally extending belt segments, said first longitudinally extending belt segment including a first end secured to said transverse belt and second end spaced from said transverse belt seoment, and said second longitudinally extending belt segment including a first end secured to said transverse belt segment and a second end that intersects with said second end of said first longitudinally extending belt segment defining a convergence point of said first and second longitudinally extending belt segments,
fixing means for selectively securing said hard-top to said belt system, and attachment means for enabling said belt system to be attached to a wall or a ceiling,
said fixing means and said attachment means being integrally arranged within said belt system,
said fixing means comprising at least two fixing lugs adapted to receive registration pins of the hard-top, said attachment means comprising two holding lugs integrally formed within and located at respective ends of said transverse belt segment said attachment means further comprising a holding lug arranged at said convergence point of said first and second longitudinally extending belt segments.

2. The holding device of claim 1, wherein said attachment means further comprises at least one holding lug located in a central area of said transverse belt segment.

3. The holding device of claim 1, wherein said fixing lugs are one of metal and plastic rings.

4. The holding device of claim 1, wherein said attachment means for each of said fixing lugs includes a closing element for releasably attaching to said registration pin inserted through said fixing lug, said closing element having a diameter greater than an inside diameter of said fixing lug.

5. The holding device of claim 4, wherein each of said closing elements is connected to a respective one of said fixing lugs.

6. The holding device of claim 1, wherein said at least one holding lug is formed by a loop of at least one of said belt segments.

7. The holding device of claim 1, wherein said at least one holding lug is one of a metal and plastic ring.

8. The holding device of claim 1, further comprising a protective cover having the shape of the hard-top and being connected to said belt system, said cover defining an interior chamber for receiving said hard-top.

9. The holding device of claim 6, wherein said fixing means comprises at least two fixing lugs adapted to receive registration pins of the hard-top, said belt system being connected to said protective cover in the area of said fixing lugs.

10. The holding device of claim 7, wherein said belt system in the area of the attachment means extends outside of said cover.

11. The holding device of claim 1, wherein said convergence point is located at a front area of said hard-top.

12. A holding device for storing a hard-top, comprising:
 a belt system for supporting the hard-top such that said belt system bears the weight of the hard-top, said belt system comprising:
 a transverse belt segment and first and second longitudinally extending belt segments, said first and second longitudinally extending belt segments being secured to said transverse belt segment, and said first and second longitudinally extending belt segments intersecting with each other defining a convergence point of said first and second longitudinally extending belt segments,
 fixing means for selectively securing said hard-top to said belt system, and attachment means for enabling said belt system to be attached to a wall or a ceiling,
 said fixing means and said attachment means being integrally arranged within said belt system,
 said fixing means comprising first and second ends of said first and second longitudinally extending belt segments, respectively, said first and second ends being separable from one another such that said hard-top is insertable into said belt system through said separated ends, said fixing means further comprising closing means arranged at said first and second ends for releasably connecting said first and second ends together, said attachment means comprising two holding lugs integrally formed within and located at respective ends of said transverse belt segment said attachment means further comprising a holding lug arranged at said convergence point of said first and second longitudinally extending belt segments.

13. The holding device of claim 12, wherein said belt system comprises first, second and third belt segments connected together.

14. The holding device of claim 13, wherein said belt segments are arranged to surround the hard-top and define an interior space into which the hard-top is placed.

15. The holding device of claim 12, wherein said closing means are hook and loop closures.

16. The holding device of claim 12, wherein said at least one holding lug is formed by a loop of at least one of said belt segments.

17. The holding device of claim 12, wherein said at least one holding lug is one of a metal and plastic ring.

18. The holding device of claim 12, further comprising a protective cover having the shape of the hard-top and being connected to said belt system, said cover defining an interior chamber for receiving said hard-top.

19. The holding device of claim 16, wherein said fixing means comprises at least two fixing lugs adapted to receive registration pins of the hard-top said belt system being connected to said protective cover in the area of said fixing lugs.

20. The holding device of claim 17, wherein said belt system in the area of said attachment means extends outside of said cover.

21. The holding device of claim 15, further comprising a zipper for closing said cover.

22. The holding device of claim 12, wherein said convergence point is located at a front area of said hard-top.

* * * * *